(12) United States Patent
Yi et al.

(10) Patent No.: US 11,568,239 B2
(45) Date of Patent: Jan. 31, 2023

(54) ARTIFICIAL INTELLIGENCE SERVER AND METHOD FOR PROVIDING INFORMATION TO USER

(71) Applicant: LG ELECTRONICS INC., Seoul (KR)

(72) Inventors: Sihyuk Yi, Seoul (KR); Wonyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 670 days.

(21) Appl. No.: 16/493,848

(22) PCT Filed: Aug. 13, 2019

(86) PCT No.: PCT/KR2019/010282
§ 371 (c)(1),
(2) Date: Sep. 13, 2019

(87) PCT Pub. No.: WO2021/029457
PCT Pub. Date: Feb. 18, 2021

(65) Prior Publication Data
US 2021/0334640 A1 Oct. 28, 2021

(51) Int. Cl.
*G06N 3/08* (2006.01)
*G10L 15/16* (2006.01)
(Continued)

(52) U.S. Cl.
CPC .............. *G06N 3/08* (2013.01); *G06F 3/011* (2013.01); *G06F 3/017* (2013.01); *G06F 3/167* (2013.01);
(Continued)

(58) Field of Classification Search
CPC .......... G06F 3/167; G06F 3/017; G06F 3/013; G06F 3/011; G06F 3/012; G10L 15/22; G10L 2015/223
See application file for complete search history.

(56) References Cited

U.S. PATENT DOCUMENTS

2007/0024579 A1* 2/2007 Rosenberg .............. G06F 3/038
345/156
2013/0339027 A1* 12/2013 Dokor ................. B60R 16/0373
704/E15.001
(Continued)

FOREIGN PATENT DOCUMENTS

JP 2015-8405 A 1/2015
JP 2017-211952 A 11/2017
(Continued)

*Primary Examiner* — Samuel G Neway
(74) *Attorney, Agent, or Firm* — Birch, Stewart, Kolasch & Birch, LLP

(57) ABSTRACT

In an artificial intelligence server for providing information to a user, the artificial intelligence server includes a communication unit configured to communicate with a plurality of artificial intelligence apparatuses deployed in a service area and a processor configured to receive at least one of speech data of the user or terminal usage information of the user from at least one of the plurality of artificial intelligence apparatuses, generate intention information of the user based on at least one of the received speech data or the received terminal usage information, generate status information of the user using the plurality of artificial intelligence apparatuses, determine an information providing device among the plurality of artificial intelligence apparatuses based on the generated status information of the user, generate output information to be outputted from the determined information providing device, and transmit a control signal for outputting the generated output information to the determined information providing device.

20 Claims, 18 Drawing Sheets

(51) Int. Cl.
*G10L 15/18* (2013.01)
*G06F 3/16* (2006.01)
*G06F 3/01* (2006.01)
*G10L 15/22* (2006.01)
*B25J 9/16* (2006.01)
*G05D 1/02* (2020.01)

(52) U.S. Cl.
CPC .............. *G10L 15/16* (2013.01); *G10L 15/18* (2013.01); *G10L 15/22* (2013.01); *B25J 9/163* (2013.01); *G05D 1/0221* (2013.01); *G10L 2015/223* (2013.01)

(56) References Cited

U.S. PATENT DOCUMENTS

| | | | |
|---|---|---|---|
| 2014/0350942 A1* | 11/2014 | Kady | G06F 3/038 704/275 |
| 2016/0012475 A1* | 1/2016 | Liu | G06Q 30/0251 705/14.49 |
| 2016/0373269 A1* | 12/2016 | Okubo | H04L 12/282 |
| 2016/0379041 A1* | 12/2016 | Rhee | G06K 9/6271 382/118 |
| 2017/0238144 A1* | 8/2017 | Chatani | H04L 67/306 455/456.3 |
| 2017/0372200 A1* | 12/2017 | Chen | G06N 3/0445 |
| 2018/0190283 A1* | 7/2018 | Xun | G10L 15/22 |
| 2018/0233147 A1* | 8/2018 | Tukka | H04L 67/025 |
| 2018/0285065 A1* | 10/2018 | Jeong | H04W 4/70 |
| 2018/0366118 A1* | 12/2018 | Lovitt | G10L 15/22 |
| 2019/0295542 A1* | 9/2019 | Huang | G06F 3/167 |
| 2019/0371002 A1* | 12/2019 | Hwang | G06N 3/08 |
| 2020/0059702 A1* | 2/2020 | Yeo | H04N 21/4131 |
| 2020/0072937 A1* | 3/2020 | Baek | H04W 4/029 |
| 2020/0349940 A1* | 11/2020 | Ko | G10L 15/22 |
| 2021/0334640 A1* | 10/2021 | Yi | G06N 3/08 |

FOREIGN PATENT DOCUMENTS

| | | |
|---|---|---|
| KR | 10-2019-0012565 A | 2/2019 |
| KR | 10-2019-0085895 A | 7/2019 |

* cited by examiner

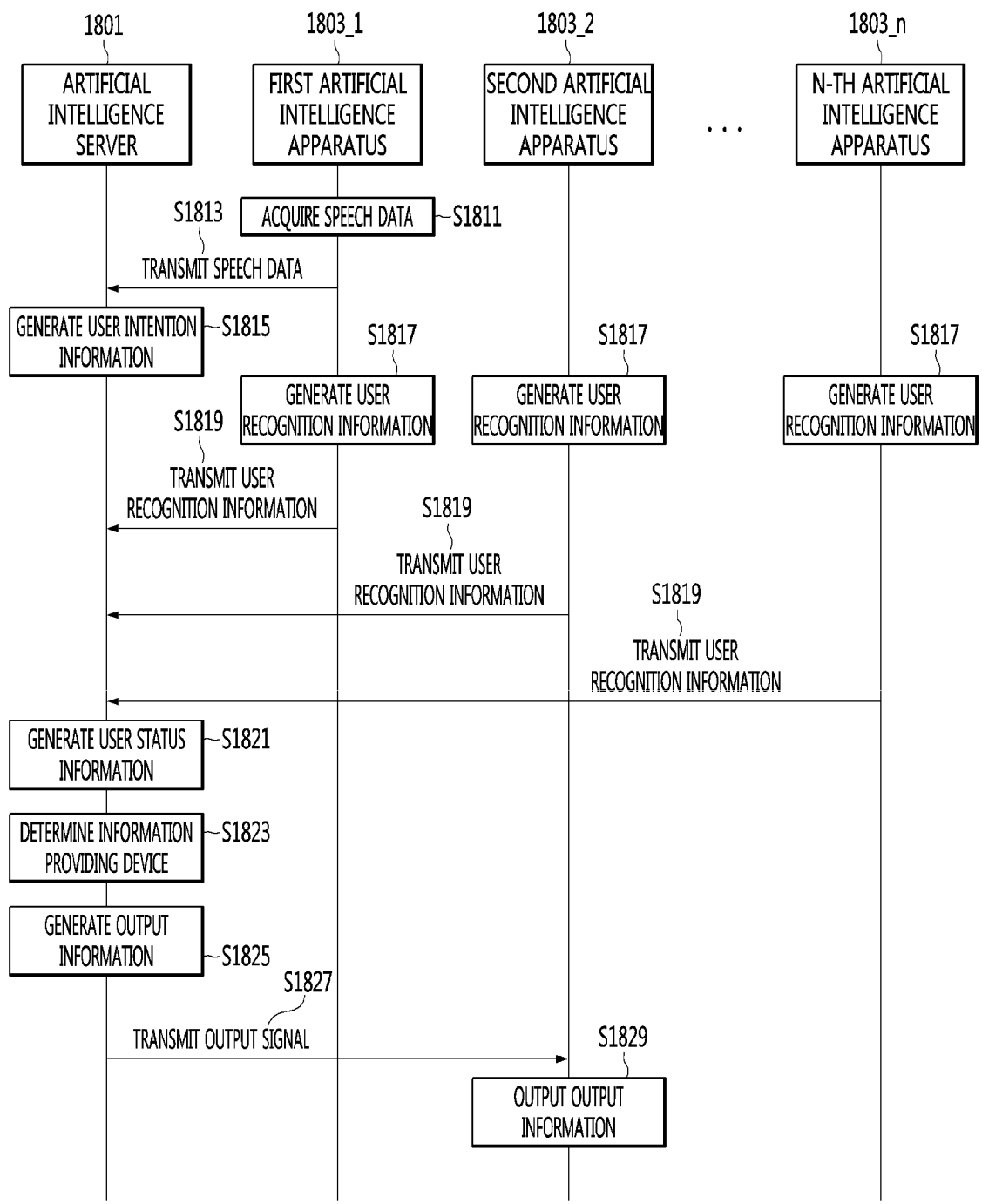

ARTIFICIAL INTELLIGENCE SERVER AND METHOD FOR PROVIDING INFORMATION TO USER

CROSS REFERENCE TO RELATED APPLICATIONS

This application is the National Phase of PCT International Application No. PCT/KR2019/010282, filed on Aug. 13, 2019, which is hereby expressly incorporated by reference into the present application.

TECHNICAL FIELD

The present invention relates to an artificial intelligence server for providing information to a user and a method thereof. Specifically, the present invention relates to an artificial intelligence server for providing information to a user using an artificial intelligence apparatus disposed in a service area and a method thereof.

BACKGROUND ART

Recently, various artificial intelligence apparatuses equipped with artificial intelligence have been spread actively, and various services can be provided through an artificial intelligence system composed of artificial intelligence apparatuses.

In the home, an artificial intelligence system with various home appliances equipped with artificial intelligence, autonomous vehicles, artificial intelligence speakers, etc. may be built, and in shopping malls, airports, and multiplexes where many people gather, artificial intelligence systems can be built with robots, kiosks, and digital signage.

However, many artificial intelligence apparatuses only interact with fixed users currently, but do not provide information effectively to multiple users while operating organically with each other. Only fixed information is provided to one user.

DISCLOSURE OF THE INVENTION

Technical Problem

The present invention is to determine the user's intention, and to determine the information providing device corresponding to the user's state from among a variety of artificial intelligence apparatuses, thereby providing an artificial intelligence server and a method for providing information suitable for a user's intention in an information providing device.

Technical Solution

An embodiment of the present invention provides an artificial intelligence server and a method for controlling the outputting information in the information providing device by receiving at least one of speech data of the user or terminal usage information of the user from at least one of a plurality of artificial intelligence apparatuses deployed in a service area, generating intention information of the user based on at least one of the received speech data or the received terminal usage information, generating status information of the user using the plurality of artificial intelligence apparatuses, determining an information providing device among the plurality of artificial intelligence apparatuses based on the generated status information of the user, generating output information to be outputted from the determined information providing device, and transmitting a control signal for outputting the generated output information to the determined information providing device.

Advantageous Effects

According to various embodiments of the present invention, a user may be effectively provided with information necessary for him/her from artificial intelligence apparatuses deployed in a service area, and each artificial intelligence apparatus may output only necessary information to prevent unnecessary information provision.

BRIEF DESCRIPTION OF THE DRAWINGS

FIG. 18 is a view illustrating an example of providing information to a user according to an embodiment of the present invention.

MODE FOR CARRYING OUT THE INVENTION

Figure 1:
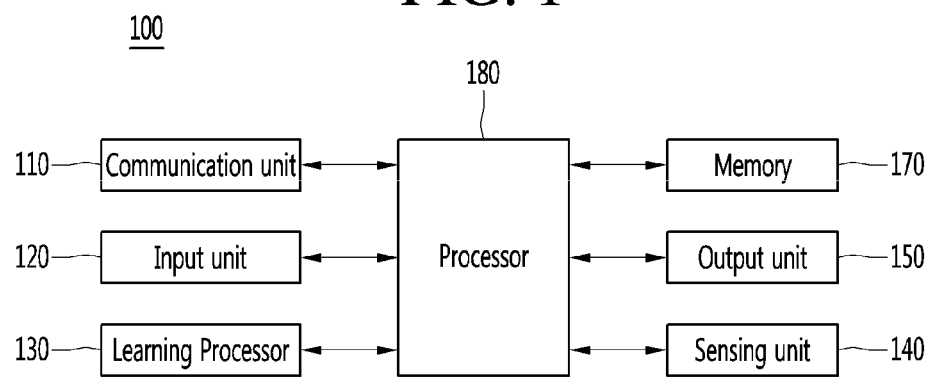
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

EXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

Hereinafter, the AI apparatus 100 may be referred to as a terminal device.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information on the AI apparatus 100, ambient environment information on the AI apparatus 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
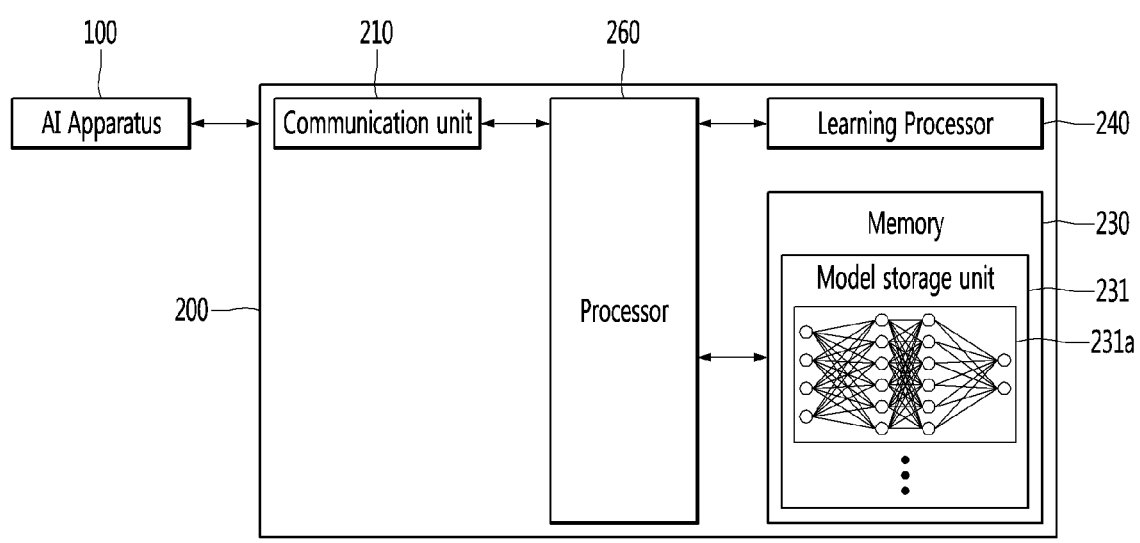
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
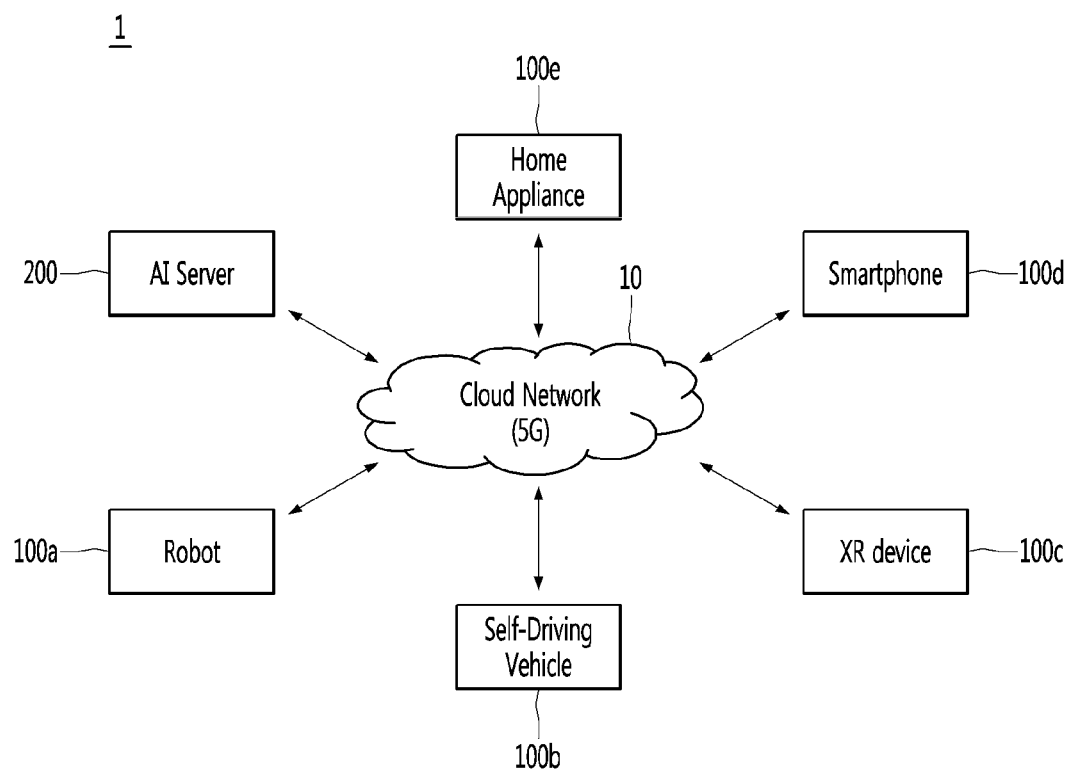
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI apparatuses 100*a* to 100*e*.

Here, the AI server 200 may learn the artificial neural network according to the machine learning algorithm instead of the AI apparatuses 100*a* to 100*e*, and may directly store the learning model or transmit the learning model to the AI apparatuses 100*a* to 100*e*.

Here, the AI server 200 may receive input data from the AI apparatuses 100*a* to 100*e*, may infer the result value for the received input data by using the learning model, may generate a response or a control command based on the inferred result value, and may transmit the response or the control command to the AI apparatuses 100*a* to 100*e*.

Alternatively, the AI apparatuses 100*a* to 100*e* may infer the result value for the input data by directly using the learning model, and may generate the response or the control command based on the inference result.

Hereinafter, various embodiments of the AI apparatuses 100*a* to 100*e* to which the above-described technology is applied will be described. The AI apparatuses 100*a* to 100*e* illustrated in FIG. 3 may be regarded as a specific embodiment of the AI apparatus 100 illustrated in FIG. 1.

AI+Robot

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information on the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

Here, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the driving unit such that the robot 100*a* travels along the determined travel route and travel plan.

The map data may include object identification information on various objects arranged in the space in which the robot 100*a* moves. For example, the map data may include object identification information on fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. Here, the robot 100*a* may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information on the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, or the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information on various objects arranged in the space (for example, road) in which the self-driving vehicle 100b travels. For example, the map data may include object identification information on fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information on the surrounding space or the real object, and render to output the XR object to be output. For example, the XR device 100c may output an XR object including the additional information on the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

AI+Robot+XR

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. Here, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information on the surrounding object.

AI+Self-Driving+XR

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
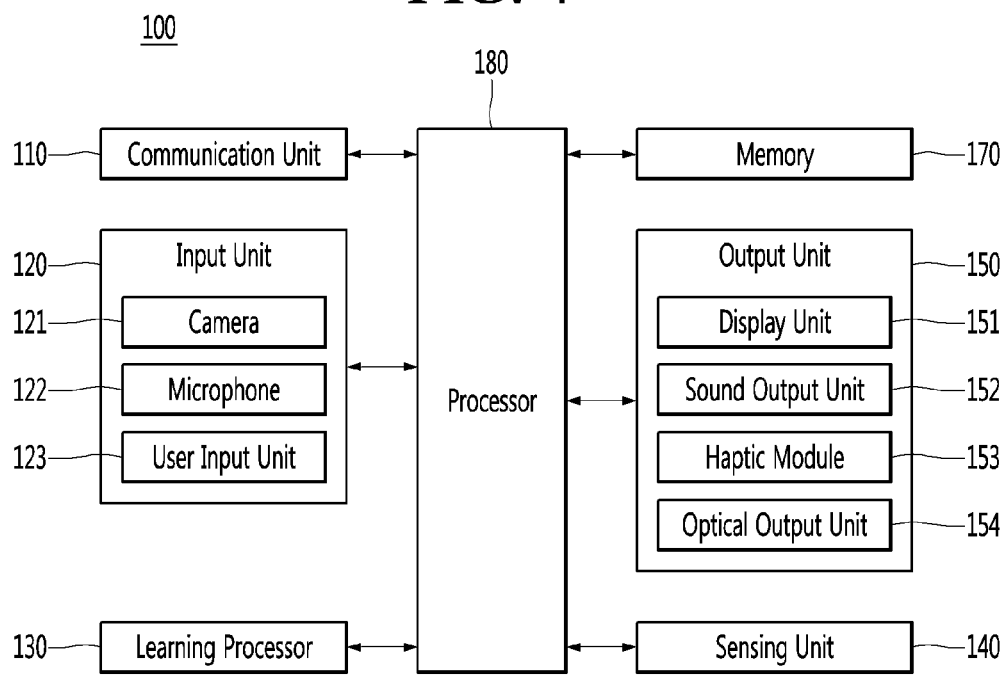
FIG. 4 is a block diagram illustrating an AI apparatuses according to an embodiment of the present invention.

FIG. 4 is a block diagram illustrating an AI apparatus 100 according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Speech data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical speech data. The processed speech data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

A sensing unit 140 may be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a speech recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
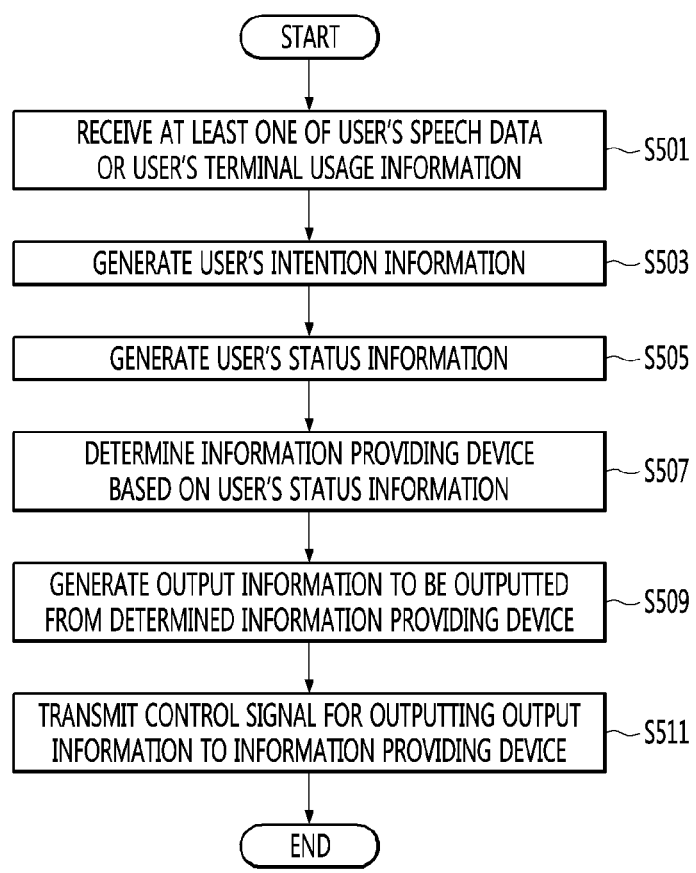
FIG. 5 is a flowchart illustrating a method of providing information to a user according to an embodiment of the present invention.

FIG. 5 is a flowchart illustrating a method of providing information to a user according to an embodiment of the present invention.

The AI server 200 communicates with at least one external device, and the external device may include a mobile terminal, an IoT device, a kiosk, a digital signage, and the like.

Hereinafter, the external device may refer to various devices including the AI apparatus 100, and may be referred to as an AI apparatus 100 in that it has an artificial intelligence function through the AI server 200.

In addition, unless otherwise specified, the AI apparatus 100 is referred to as including a user terminal.

Referring to FIG. 5, the processor 260 of the AI server 200 receives at least one of user's speech data or user's terminal usage information (S501).

Here, the processor 260 may receive speech data of the user corresponding to the user speak voice from at least one of the user terminal, the AI apparatus 100 deployed in the service area or the microphone deployed in the service area through the communication unit 210.

The service area may mean an area in which the AI server 200 may provide information to a user using at least one AI apparatus 100, and may mean an area in which at least one AI apparatus 100 is installed.

Here, the processor 260 may receive the terminal usage information of the user from the user terminal or the AI apparatus 100 being used by the user through the communication unit 210.

The terminal usage information may include a usage record and user identification information of the user terminal or AI apparatus 100 of the user.

The user identification information is information for identifying a specific user among various users, and may include user terminal information, user account information, user authentication information, or user recognition information stored in the terminal.

The user recognition information may include user speech recognition information, user face recognition information, user iris recognition information, or user fingerprint recognition information. Specifically, the user recognition information may include features used for voiceprint recognition, face recognition, iris recognition, or fingerprint recognition.

Here, the memory 260 of the AI server 200 may store at least one or more of user identification information, user identification information, user terminal information, and user account information, which can distinguish each user.

Here, the communication unit 210 may transmit/receive data with the user terminal, the AI apparatus 100 or the AI apparatus 100 through a base station or directly using 5G communication technology.

Then, the processor 260 of the AI server 200 generates intention information of the user based on at least one of user's speech data or user's terminal usage information (S503).

Speech data of the user may include a query, request, or command that is explicitly spoken by the user, and may include a conversation in which the user does not specify a query or request.

For example, the user's speech data may include an explicit command or request, such as "Please tell me how to get to XX Cafe." and may also include conversations that do not specify a query or request, such as "Go to XX Cafe."

If the speech data includes a query, request, or command that is explicitly spoken by the user, the processor 260 may generate intention information of the user based on a query, a request, or a command included in the speech data.

That is, as in the above example, if "Please tell me how to get to XX Cafe." is included in speech data of the user, the processor 260 may generate the user's intention information based on the speech data, such as "Go to XX cafe" or "Confirm path to XX cafe."

Here, the processor 260 may generate intention information by grasping the intention of an explicit query, request, or command included in the speech data using a Natural Language Processing (NLP) technique or a natural language processing engine.

If the speech data does not include an explicit query, request, or command but a conversation, the processor 260 may generate the intention information of the user by analyzing the conversation content included in the speech data.

That is, as in the above example, if "Want to go to XX Cafe." is included in speech data of the user, the processor 260 may generate the user's intention information based on the speech data, such as "Go to XX cafe" or "Confirm path to XX cafe."

Here, the processor 260 may extract a keyword from the conversation included in the speech data, and generate intention information highly related to the conversation included in the speech data based on the extracted keyword.

For example, if "Want to go to XX Cafe." Is included in speech data of the user, the processor 260 may extract keywords of "XX cafe" and "go" from the conversation, and generate intention information such as "Go to XX cafe" or "Confirm path to XX cafe" which is highly related to the extracted keywords.

The processor 260 may generate intention information from the received speech data using the first intention information generation model.

The first intention information generation model includes an artificial neural network and may be learned using a machine learning algorithm or a deep learning algorithm.

Here, the first intention information generation model may be learned by supervised learning.

The terminal usage information of the user may include at least one of a usage record, a search record, a search result, and a search result reading record of the user terminal or the AI apparatus 100.

For example, if a user executes a map application or an internet browser and searches for "XX cafe" and then, reads a search result for "XX cafe" located in "YY area" in the search results, the terminal usage information may include information of using a map application or an internet browser, information of searching for "XX cafe", information of reading a search result of "XX cafe" located in "YY area", and the like.

The processor 260 may generate intention information from the received terminal usage information using the second intention information generation model.

The second intention information generation model includes an artificial neural network and may be learned using a machine learning algorithm or a deep learning algorithm.

Here, the second intention information generation model may be learned by supervised learning.

That is, as shown in the above example, when the terminal usage information includes information indicating that a map application or an internet browser was used, information that the "XX cafe" was searched, and information indicating that a search result for the "XX cafe" located in the "YY area" was read, the processor 260 may generate intention information such as "Go to XX cafe in YY area" or "Path to XX cafe in YY area" from the terminal usage information using the second intention information generation model.

Then, the processor 260 of the AI server 200 generates user's status information (S505).

The user's status information may include at least one of a user's location, a user's route, a user's moving direction, a user's gaze direction, or a user's motion.

The processor 260 may generate user's status information based on at least one of speech data, image data, or user's terminal status information.

The image data for the user is image data including the user, and may be generated from at least one of a user terminal, an AI apparatus 100 deployed in a service area, or a camera deployed in a service area.

The user terminal status information may include at least one of location information of the user terminal, operation status information of the user terminal, or input status information of the user terminal.

The processor 260 may recognize a user included in the image data by using a user recognition model.

The user recognition model is a model that distinguishes and identifies a plurality of users, and may recognize the user by using various methods such as facial recognition or gait recognition.

Here, the user recognition model may include an artificial neural network, and may be supervised and learned using a machine learning algorithm or a deep learning algorithm.

Here, the processor 260 may receive terminal usage information through the communication unit 210 and store user identification information included in the received terminal usage information in the memory 230. Then, the user identification information may be used for learning the user recognition model.

Here, the processor 260 or the running processor 240 may train the user recognition model by using image data including a specific user and user identification information of the user.

The processor 260 receives image data of the user from at least one of a user terminal, an AI apparatus 100 deployed in a service area, or a camera deployed in a service area through the communication unit 210, and recognizes the user from the received image data and generates user's status information including at least one of a user's location, a user's movement, a user's moving direction, a user's gaze direction, or a user's motion.

For example, the processor 260 may recognize the face of the user from the image data of the user, determine the direction of the user's face or eyeball, and determine the user's gaze direction.

In addition, the processor 260 may use the plurality of image data to more accurately generate user's status information. For example, the processor 260 may generate user's status information using image data generated by various devices, or may generate user's status information using a plurality of image data generated by a single device.

For example, the processor 260 may determine the location of the user from the plurality of image data with respect to the user, and determine the route of the user or the moving direction of the user based on the change of the location of the user. In addition, the processor 260 may determine the posture of the user from the plurality of image data with respect to the user, and determine the operation of the user based on the change of the posture of the user.

The processor 260 may determine a location of a user by using location information of each of the AI apparatuses 100 deployed in the service area stored in the memory 230 and image data of the user received from the plurality of AI apparatuses 100.

For example, if image data for a user includes depth information, the processor 260 may recognize the user from the image data, calculate a distance between the recognized user and the AI apparatus 100 that generates the image data, and determine the location of the user using the calculated distance.

In an embodiment, the processor 260 may receive a user recognition result or a user identification result from the AI apparatus 100 and generate user's status information based on the received result.

That is, each AI apparatus 100 directly recognizes a user using a user recognition model, and the processor 260 may receive a user recognition result from the AI apparatus 100 instead of speech data or image data, and generate user's status information based on the received recognition result.

In this case, the processor 260 may transmit, to the AI apparatus 100, at least one or more of a user recognition model or user identification information used for recognition of the user through the communication unit 210.

Then, the processor 260 of the AI server 200 determines an information providing device based on user's status information (S507).

The processor 260 may determine at least one information providing device to provide information to a user among the AI apparatuses 100 disposed in the service area.

The information providing device may be determined among the AI apparatus 100 having a speaker or a display.

The processor 260 may determine the information providing device based on at least one of a user's location, a user's moving direction, a user's route, and a user's gaze direction included in user's status information.

Here, the processor 260 may calculate a distance from each AI apparatus 100 to the user based on the location information of each of the AI apparatuses 100 deployed in the service area and the location information of the user. In addition, the information providing device may be determined among the AI apparatuses 100 whose distance to the user is within a predetermined level.

For example, the processor 260 may determine the AI apparatus 100 located within the first reference distance from the user as the information providing device.

Here, the processor 260 may calculate the distance or the proximity from each AI apparatus 100 to the user's route based on the location information of each of the AI apparatuses 100 deployed in the service area and the user's route. In addition, the information providing device may be determined among the AI apparatuses 100 whose distance to the user's route is within a predetermined level.

For example, the processor 260 may determine the AI apparatus 100 adjacent to the user's route as the information providing device.

Here, the processor 260 may determine the information providing device from among the AI apparatuses 100 included in the user's view based on the direction of the user's line of sight.

For example, the processor 260 may be located within a predetermined angle from the user's line of sight and determine the AI apparatus 100 having a smaller distance to the user than the second reference distance as an information providing device.

In addition, the processor 260 may determine the information providing device in consideration of the user's intention information as well as the user's status information.

Here, the processor 260 may obtain destination information to be moved by the user or route information to be moved by the user from the intention information of the user, and determine the information providing device based on the obtained destination information or route information.

For example, the processor 260 may determine a destination and a route to the destination from the user's intention information at the current user's location, and determine a device adjacent to a determined path among the AI devices 100 as an information providing device.

That is, the information providing device may be determined based on the location of the actual user, such as the location of the user or the path that the user is moving, and may also be determined based on the path that the user is expected to travel, such as the path to the destination.

Then, the processor 260 of the AI server 200 generates output information to be outputted from the determined information providing device (S509).

The processor 260 may generate output information based on the intention information of the user.

For example, when the user's intention information is "Confirm path to XX cafe," the processor 260 may generate output information including "Path to XX cafe."

The processor 260 may classify and generate output information for each determined information providing device.

For example, if the output information is "path to XX cafe", the processor 260 may determine the first output information to be outputted by the first information providing device as a "path from the first information providing device to the XX cafe", and determine the second output information to be outputted by the second information providing device as a "path from the second information providing device to the XX cafe".

Here, the processor 260 may generate output information including information related to intention information of the user.

For example, when the user's intention information is "Confirm path to XX cafe," the processor 260 may generate output information including "Path to XX cafe" and "Business hours of XX cafe."

Here, the processor 260 may generate output information including advertisement information related to intention information of the user.

For example, if the user intention information is "Confirm path to XX Cafe," the processor 260 may generate output information including advertisements for other cafes or advertisements for coffee-related products.

Here, the processor 260 may generate output information including information indicating a user to receive the information.

Then, the processor 260 of the AI server 200 transmits a control signal for outputting the generated output information to the determined information providing device (S511).

The output information may be generated according to each information providing device, and the processor 260 may transmit a control signal for outputting output information corresponding to each information providing device.

The control signal may include at least one of a control signal for outputting the output information as an image through a display unit of the information providing device or a control signal for outputting the output information as a sound through a speaker of the information providing device.

The above description is merely made based on the relationship between the AI server 200 and one user, and the AI server 200 may generate intention information and status information for each of the plurality of users individually, and determine the information providing device and output information for each of the plurality of users.

Accordingly, the AI server 200 may provide personalized information to the user by using the plurality of AI apparatuses 100.

Steps S501 to S511 shown in FIG. 5 may be repeatedly performed, and therefore, the AI server 200 may updates intention information of a user or status information of the user periodically or in real time, and may change the output information or the information providing device accordingly when the intention information of the user changes or the status information of the user changes.

For example, if the user is looking at the first external device, the processor 260 may determine the first external device as an information providing device, and when the user changes the gaze from the first external device to the second external device, the processor 260 may change the information providing device from the first external device to the second external device.

For example, if the user is adjacent to the first external device, the processor 260 may determine the first external device as an information providing device, and when the user moves near the second external device, the processor 260 may change the information providing device from the first external device to the second external device.

Figure 6:
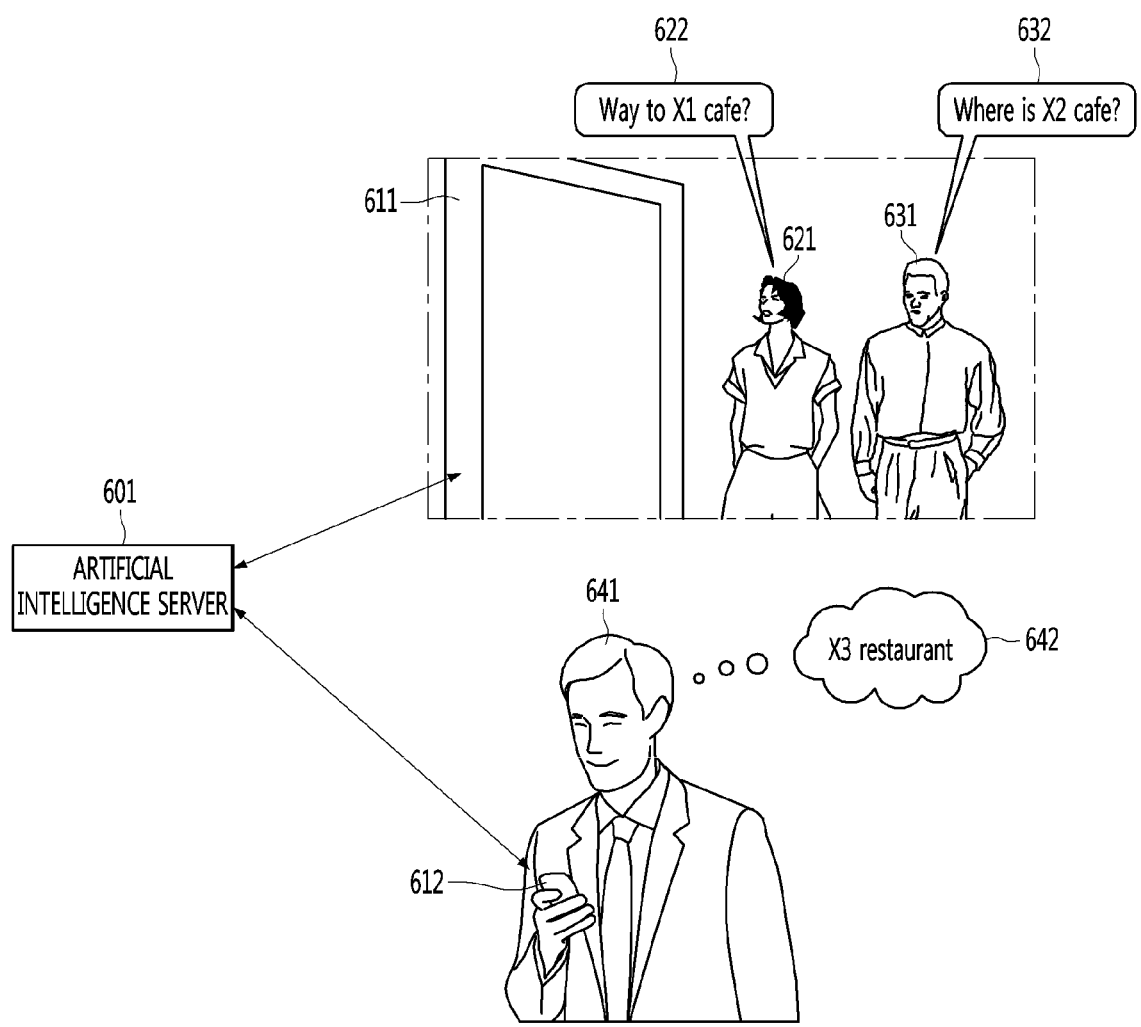
FIG. 6 is a view illustrating an example of generating intention information of a user according to an embodiment of the present invention.

FIG. 6 is a view illustrating an example of generating intention information of a user according to an embodiment of the present invention.

Referring to FIG. 6, the AI server 601 may communicate with an AI apparatus 611 or a user terminal 612 deployed in a service area.

The AI apparatus 611 may mean a kiosk, a digital signage, a home appliance, or the like.

The user terminal 612 may mean a smartphone.

The first user 621 speaks 622 with "Way to X1 cafe?" to the AI apparatus 611, and the second user 631 speaks 632 with "Where is X2 cafe?" to the AI apparatus 611, and the third user 641 may search 642 for information on "X3 restaurant" using the user terminal 612.

The AI server 601 may receive speech data corresponding to the speech 622 spoken by the first user 621 and speech data corresponding to the speech 632 spoken by the second user 631 from the AI apparatus 611, and receive terminal usage information corresponding to information 642 searched by the third user 641 from the user terminal 612.

Then, the AI server 601 may determine the intention information of the first user 621 as "Confirm route to X1 cafe", determine the intention information of the second user 631 as "Confirm route to X2 cafe", and determine the intention information of the third user 641 as "Confirm route to X3 restaurant" based on the received speech data and terminal usage information.

And, as mentioned above, the AI server 601 may determine an information providing device among a plurality of AI apparatuses or user terminals deployed in the service area, generate output information to be outputted from the information providing device, and transmit a control signal for outputting the generated output information to the information providing device.

In FIG. 6, the AI apparatus 611 of the user generates speech data of the user, and the user terminal 612 generates terminal usage information of the user. However, the present invention is not limited thereto.

That is, when the user uses the AI apparatus 611, the AI apparatus 611 may generate terminal usage information and transmit the generated terminal usage information to the AI server 601. In addition, when a user provides a query with a speech using the user terminal 612, the user terminal 612 may generate speech data corresponding to the speak voice of the user and transmit the speech data to the AI server 601. Then, the AI server 601 may generate intention information of each user using the received terminal usage information or speech data.

Figure 7:
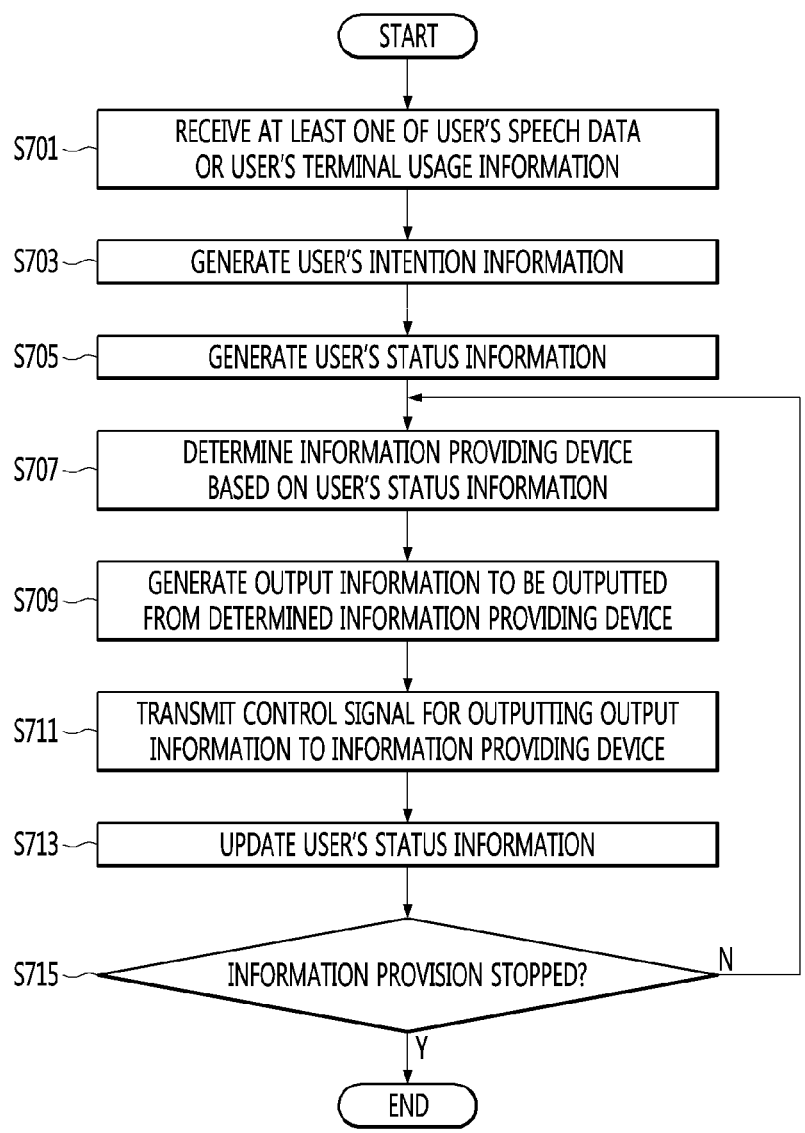
FIG. 7 is a flowchart illustrating a method of providing information to a user according to an embodiment of the present invention.

FIG. 7 is a flowchart illustrating a method of providing information to a user according to an embodiment of the present invention.

Description overlapping with FIG. 5 will be omitted.

Referring to FIG. 7, the processor 260 of the AI server 200 receives at least one of user's speech data or user's terminal usage information (S701). This corresponds to step S501 of FIG. 5.

Then, the processor 260 of the AI server 200 generates intention information of the user based on at least one of user's speech data or user's terminal usage information (S703). This corresponds to step S503 of FIG. 5.

Then, the processor 260 of the AI server 200 generates user's status information (S705). This corresponds to step S505 of FIG. 5.

Then, the processor 260 of the AI server 200 determines an information providing device based on user's status information (S707). This corresponds to step S507 of FIG. 5.

Then, the processor 260 of the AI server 200 generates output information to be outputted from the determined information providing device (S709). This corresponds to step S509 of FIG. 5.

Then, the processor 260 of the AI server 200 transmits a control signal for outputting the generated output information to the determined information providing device (S711). This corresponds to step S511 of FIG. 5.

Then, the processor 260 of the AI server 200 updates user's status information (S713).

The processor 260 may receive at least one of speech data, image data, or terminal usage information from at least one of the AI apparatus 100 or the user terminal deployed in the service area, and update the user's status information by using the received data.

For example, the processor 260 may identify the user in the image data and determine the location of the identified user accordingly.

Then, the processor 260 of the AI server 200 determines whether to stop providing information (S715).

The processor 260 may determine whether to stop providing the information based on the updated status information of the user.

Here, the processor 260 may determine whether to stop providing the information by determining whether the user completes an operation corresponding to the user's intention information, whether the user's intention information is changed or whether the user lefts the service area, and the like.

For example, if the user's intention information is "Go to AA Place" or "Confirm path to AA Place", if it is determined that a user arrives at "AA Place" as a destination, the processor 260 may determine to stop providing information.

For example, if the user's intention information is "Go to AA Place", if it is determined that user's intention information is changed to another, the processor 260 may determine to stop providing information on the corresponding intention information. In this case, the processor 260 may proceed again from operation S701 to newly generate the user's intention information, and provide the information to the user accordingly.

For example, when the user leaves the service area, the processor 260 may determine to stop providing information.

If it is determined based on a determination result of step S715 that the provision of the information is terminated, the processor 260 stops to providing the information for the corresponding user.

If it is determined based on a determination result of step S715 that the provision of the information is not terminated, the processor 260 may return to step S707 of determining the information providing device and continue to provide the information to the user.

FIGS. 8 to 11 are views illustrating an example of providing information to a user according to an embodiment of the present invention.

Figure 8:
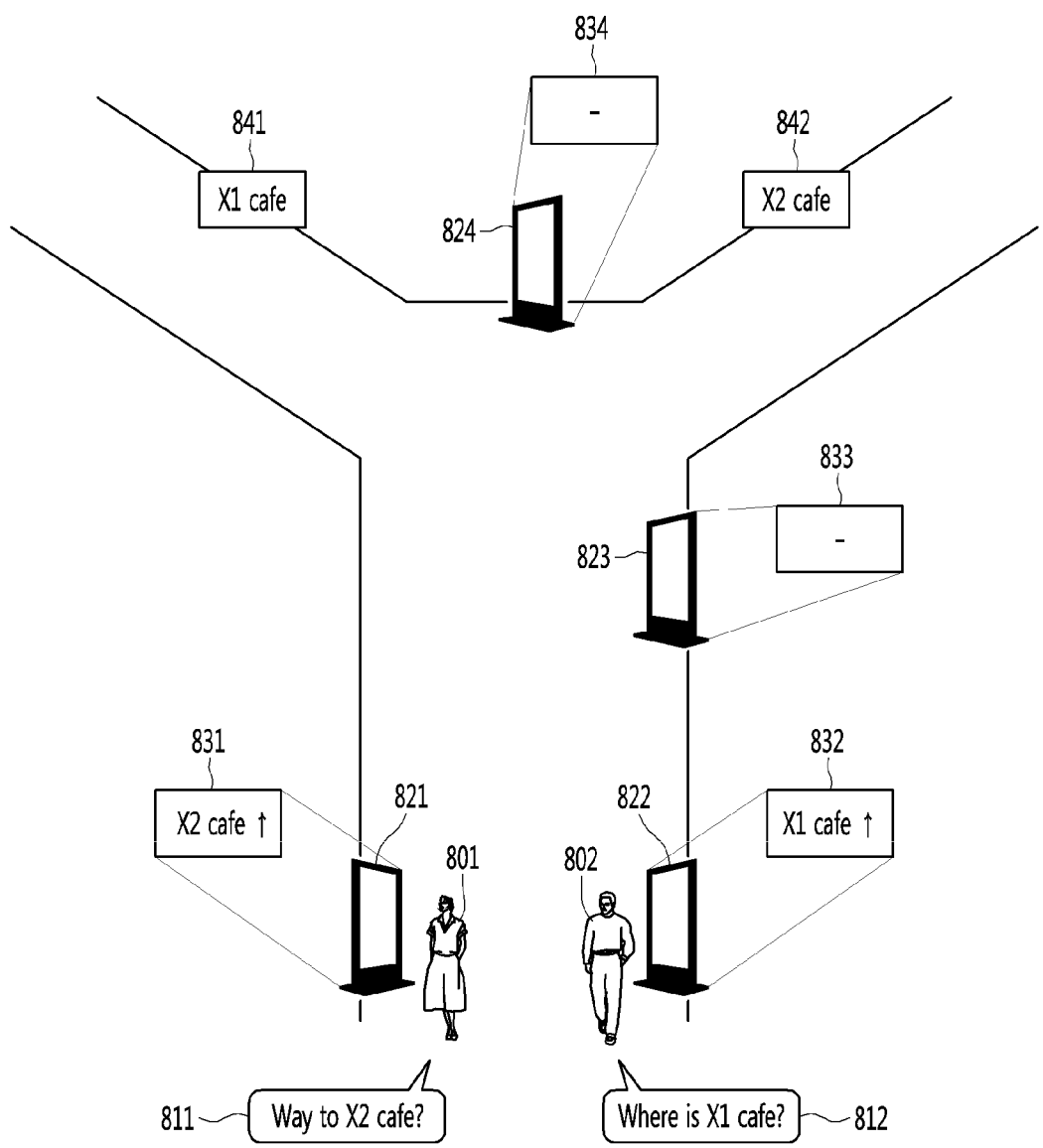
FIGS. 8 to 11 are views illustrating an example of providing information to a user according to an embodiment of the present invention.

FIG. 8 illustrates a situation in which the first user 801 asks the first AI apparatus 821 for directions, and the second user 802 asks the second AI apparatus 822 for directions. Here, AI apparatuses 821, 822, 823, and 824 may be digital signage, kiosk, or the like.

Referring to FIG. 8, the first user 801 may speak 811 to the first AI apparatus 821, such as "Way to X2 cafe?", and ask for the path to the X2 cafe 842. Similarly, the second user 802 may speak 812 to the second AI apparatus 822, such as "Where is X1 cafe?" and ask for the path to the X1 cafe 841.

Although not shown in FIG. 8, the AI server 200 receives speech data for the first user 801 from the first AI apparatus 821, and receives speech data for the second user 802 from the second AI apparatus 822, so that it may determine the first intention information of the first user 801 as "Confirm path to X1 cafe 841" and the second intention information of the second user 802 as "Confirm path to X2 cafe 842".

Then, the AI server 200 may determine the first AI apparatus 821 adjacent to the first user 801 as an information providing device for the first user 801, and determine the second AI apparatus 822 adjacent to the second user 802 as the information providing device for the second user 802.

Then, the AI server 200 may transmit a control signal for outputting output information corresponding to each information providing device.

In other words, the first AI apparatus 821 may output a message including "X2 cafe ↑", which means moving forward to go to the X2 cafe 842, as output information corresponding to the first intention information of the first user 801 (831).

In addition, the second AI apparatus 822 may output a message including "X1 cafe ↑", which means moving forward to go to the X1 cafe 841, as output information corresponding to the second intention information of the second user 802 (832).

However, the outputted message may be outputted in the form of text through the display, but may be outputted in the form of an image, or may be outputted in speech through a speaker.

Here, the AI server 200 may not output the output information for the first user 801 and the second user 802 to the third AI apparatus 823 and the fourth AI apparatus 824 which are not adjacent to the first user 801 and the second user 802 (833, 834).

Figure 9:
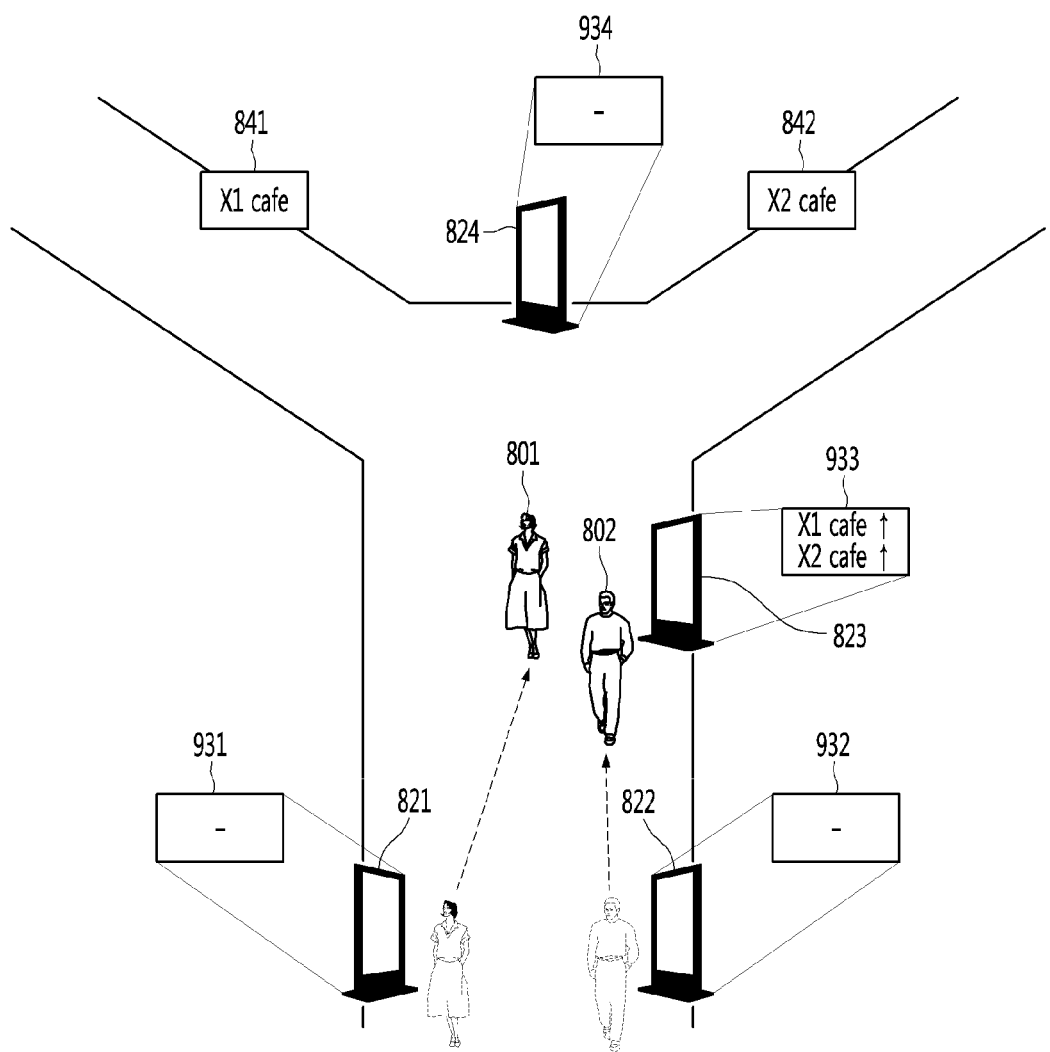

FIG. 9 illustrates a situation in which the first user 801 and the second user 802 move forward to be adjacent to the third AI apparatus 823 after the situation of FIG. 8.

Referring to FIG. 9, the AI server 200 may determine that the first user 801 and the second user 802 are far from the first AI apparatus 821 and the second AI apparatus 822 through image data or audio data generated by the first AI apparatus 821 and the second AI apparatus 822. In the same manner, the AI server 200 may determine that the first user 801 and the second user 802 are adjacent to the third AI apparatus 823 through the image data or the audio data generated by the third AI apparatus 823.

Then, the AI server 200 may determine the third AI apparatus 823 as the information providing device for the first user 801 and the second user 802.

Then, the AI server 200 may transmit a control signal for outputting output information on the first user 801 and output information on the second user 802 to the third AI apparatus 823.

That is, the third AI apparatus 823 may output a message including "X1 cafe ↑" and "X2 cafe ↑" as output information corresponding to the first intention information of the first user 801 and output information corresponding to the intention information of the second user 802 (933).

Here, the AI server 200 may control not to output the output information on the first user 801 and the second user 802 to the first AI apparatus 821, the second AI apparatus 822, and the fourth AI apparatus 824, which are not adjacent to the first user 801 and the second user 802 (931, 932, 934).

Figure 10:
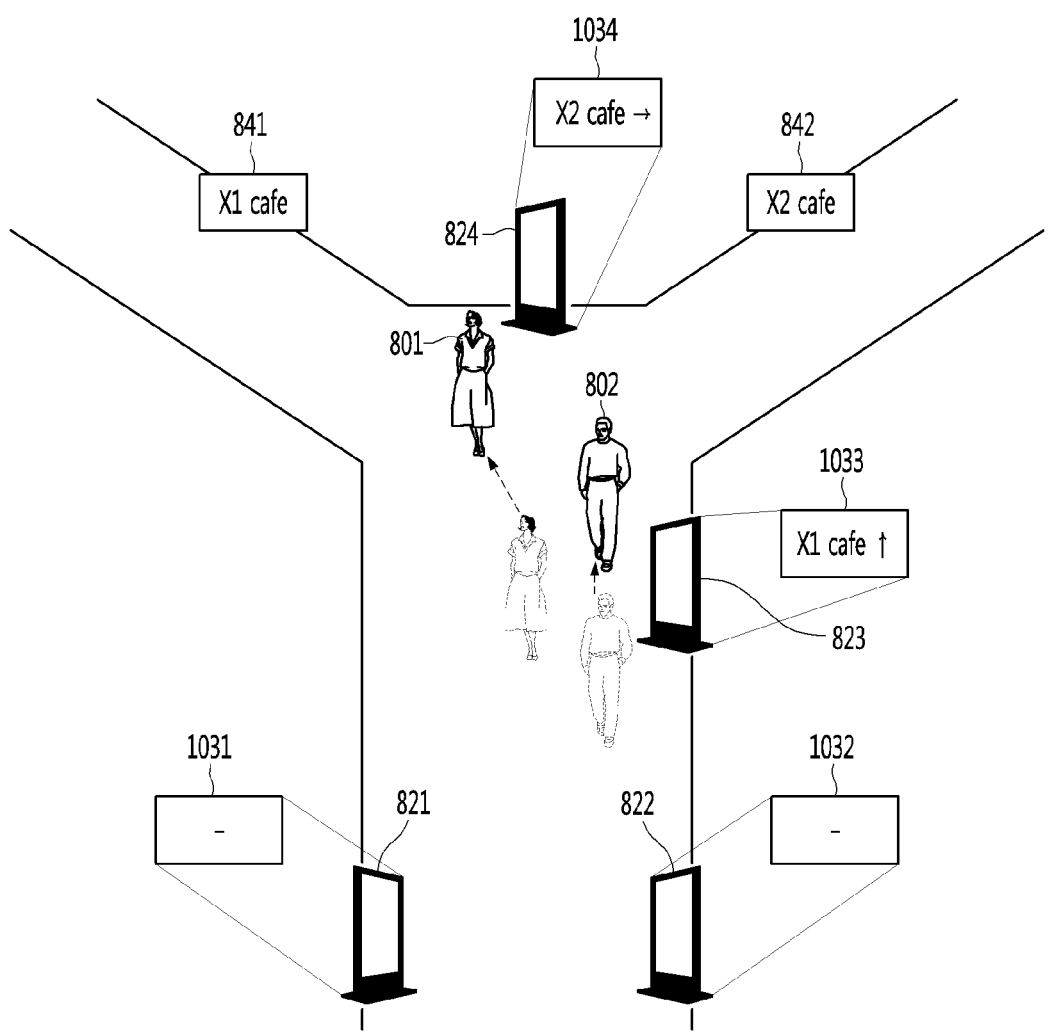

FIG. 10 illustrates a situation in which after the situation of FIG. 9, the first user 801 moves forward to be adjacent to the fourth AI apparatus 824, and the second user 802 moves forward but still is adjacent to the third AI apparatus 823.

Referring to FIG. 10, the AI server 200 may determine that the first user 801 is far from the third AI apparatus 823 through image data or speech data generated by the third AI apparatus 823. In the same manner, the AI server 200 may determine that the first user 801 is adjacent to the fourth AI apparatus 824 through the image data or the audio data generated by the fourth AI apparatus 824.

Then, the AI server 200 maintains the third AI apparatus 823 as the information providing device for the second user 802 and determines the fourth AI apparatus 824 as the information providing device for the first user 801.

Then, the AI server 200 may transmit a control signal for outputting output information on the first user 801 to the fourth AI apparatus 824, and transmit a control signal for outputting output information on the second user 802 to the third AI apparatus 823.

That is, the fourth AI apparatus 824 may output a message including "X2 cafe →" as output information corresponding to the first intention information of the first user 801 (1034).

In addition, the third AI apparatus 823 may output a message including "X1 cafe ↑" as output information corresponding to the intention information of the second user 802 (1033).

Here, the AI server 200 may control not to output the output information for the first user 801 and the second user 802 to the first AI apparatus 821 and the second AI apparatus 822 which are not adjacent to the first user 801 and the second user 802 (1031, 1032).

Figure 11:
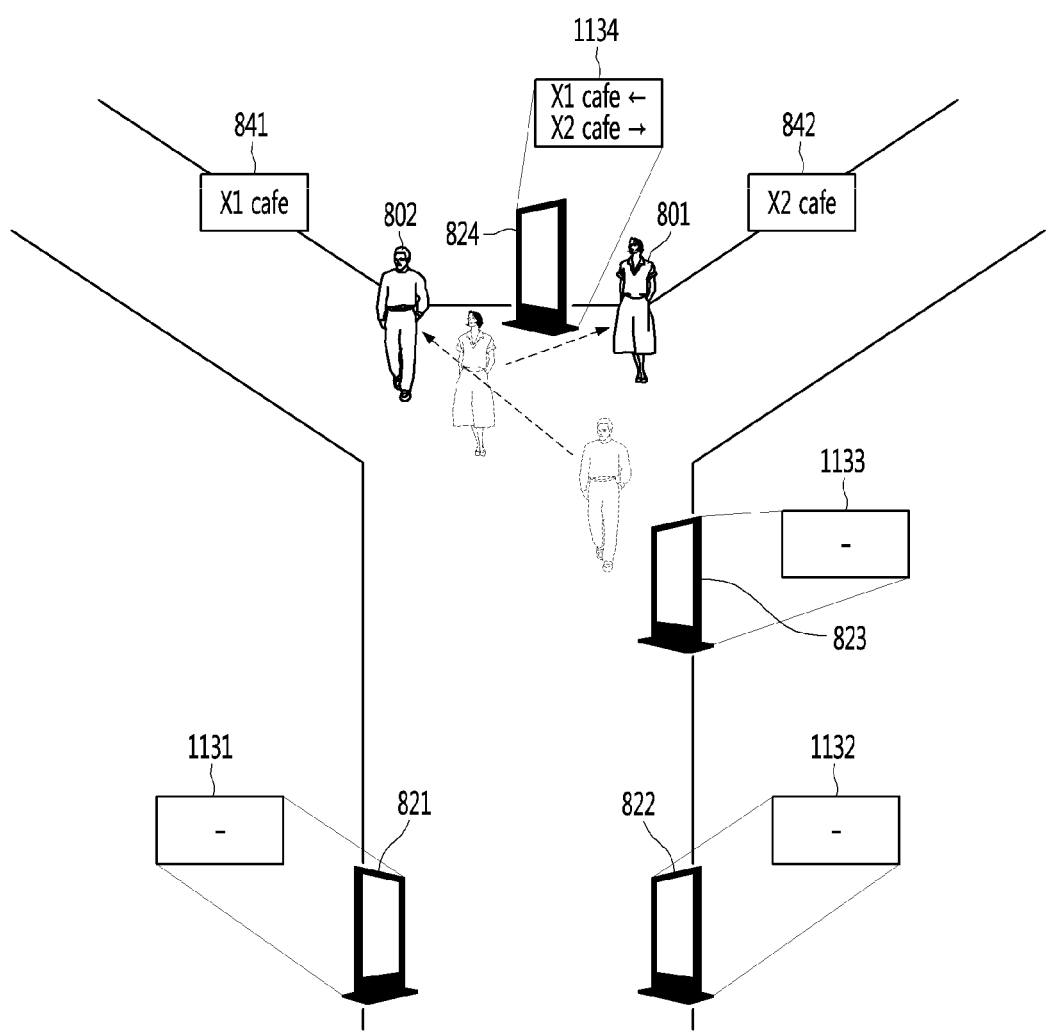

FIG. 11 illustrates a situation in which after the situation of FIG. 10, the first user 801 moves to the right but still is adjacent to the fourth AI apparatus 824, and the second user 802 moves forward but still is adjacent to the fourth AI apparatus 824.

Referring to FIG. 11, the AI server 200 may determine that the second user 802 is far from the third AI apparatus 823 through image data or speech data generated by the third AI apparatus 823. In the same manner, the AI server 200 may determine that the first user 801 and the second user 802 are adjacent to the fourth AI apparatus 824 through the image data or the audio data generated by the fourth AI apparatus 824.

Then, the AI server 200 may determine the fourth AI apparatus 824 as the information providing device for the first user 801 and the second user 802.

Then, the AI server 200 may transmit a control signal for outputting output information on the first user 801 and outputting output information on the second user 802 to the fourth AI apparatus 824.

That is, the fourth AI apparatus 824 may output a message including "X1 cafe ←" and "X2 cafe →" as output information corresponding to the first intention information of the first user 801 and output information corresponding to the intention information of the second user 802 (1134).

Here, the AI server 200 may control not to output the output information on the first user 801 and the second user 802 to the first AI apparatus 821, the second AI apparatus 822, and the third AI apparatus 823, which are not adjacent to the first user 801 and the second user 802 (1131, 1132, 1133).

As shown in FIGS. 8 to 11, the AI server 200 may generate intention information for each user, determine an information providing device for each user, and transmit a control signal for outputting the output information to the determined information providing device in order to provide the appropriate information to each user.

In FIGS. 8 to 11, the information providing device is determined based only on the distance between the user and the AI apparatus. As described above, the present invention is not limited thereto.

In addition, in FIGS. 8 to 11, the information providing device is determined among the AI apparatuses, but the user terminal may also be determined as the information providing device. That is, the AI server 200 may provide information to the user using the user terminal.

Figure 12:
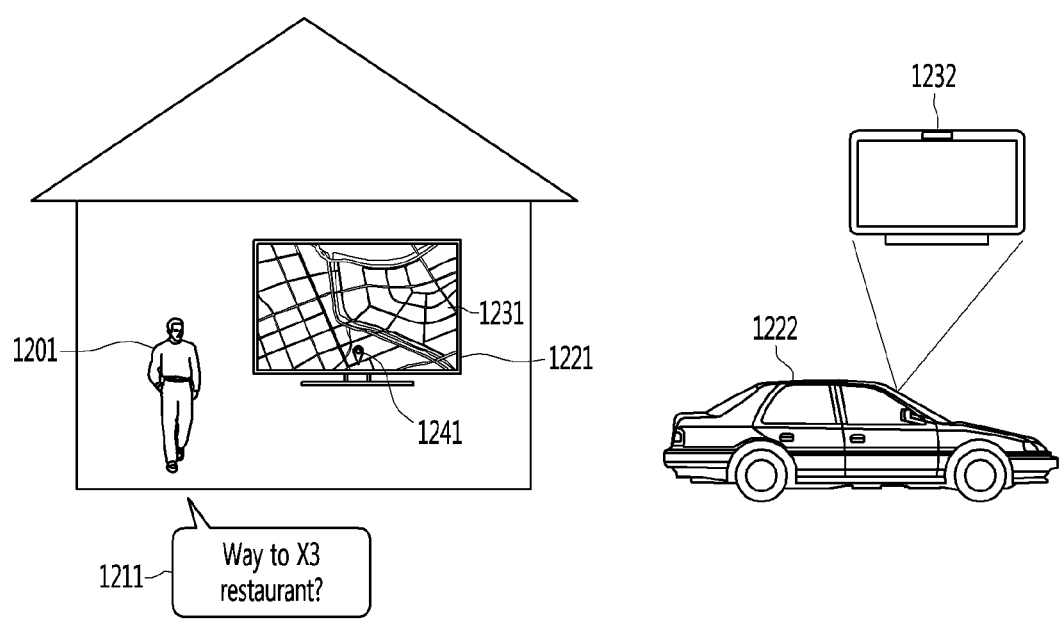
FIGS. 12 and 13 are views illustrating an example of providing information to a user according to an embodiment of the present invention.
Figure 13:
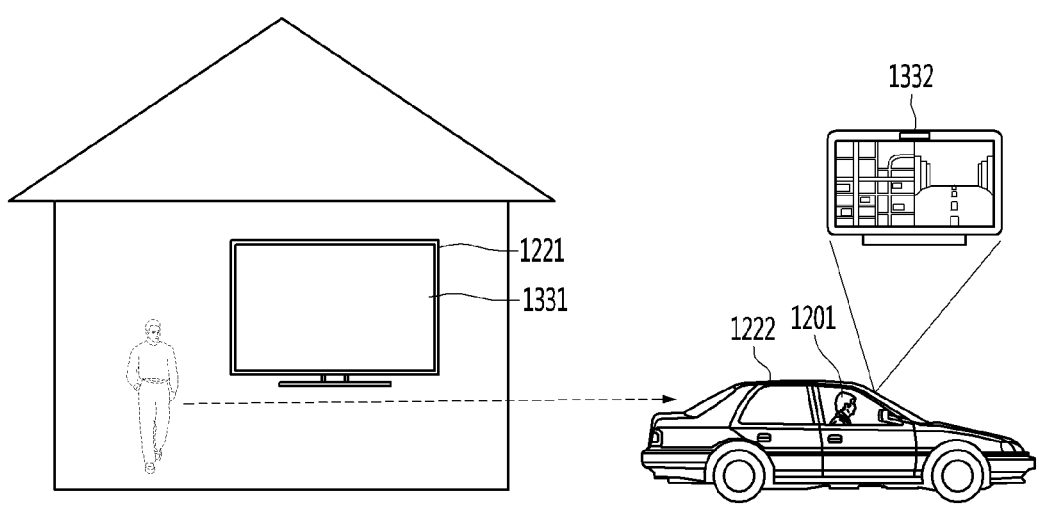

FIGS. 12 and 13 are views illustrating an example of providing information to a user according to an embodiment of the present invention.

FIG. 12 illustrates a situation in which the user 1201 asks the first AI apparatus 1221 for directions. Here, the first AI apparatus 1221 may be a TV. Then, the second AI apparatus 1222 may be a vehicle.

Referring to FIG. 12, the user 1201 may speak 1211, such as "Way to X3 restaurant?", and ask for the path to the X3 restaurant 1241.

Although not shown in FIG. 12, the AI server 200 receives speech data for the user 1201 from the first AI apparatus 1221 so that it may determine the intention information of the user 1201 as "Confirm path to X3 restaurant 1231."

Also, even if the user 1201 does not speak directly, the AI server 200 may obtain user schedule information from a user terminal or the like and determine intention information based on the obtained user schedule information.

Then, the AI server 200 may determine the first AI apparatus 1221 adjacent to the user 1201 as an information providing device for the user 1201, and the AI server 200 may transmit a control signal for outputting output information corresponding to the information providing device.

That is, the first AI apparatus 1221 may output a map indicating a path for moving to the X3 restaurant 1241 as output information corresponding to the intention information of the user 1201 (1231).

Here, the AI server 200 may control not to output the output information on the user 1201 to the second AI apparatus 1222 not adjacent to the user 1201 (1232).

FIG. 13 illustrates a situation in which the user 1201 boards the second AI apparatus 1222 after the situation of FIG. 12.

Referring to FIG. 13, the AI server 200 may determine that the user 1201 is far from the first AI apparatus 1221 through image data or speech data generated by the first AI apparatus 1221.

In the same manner, the AI server 200 may determine that the user 1201 boards the second AI apparatus 1222 through image data or speech data generated by the second AI apparatus 1222. Alternatively, it may be determined that the user 1201 boards the second AI apparatus 1222 through terminal usage information or status information (e.g., startup information and door opening/closing information) on the second AI apparatus 1222 of the AI server 200.

Then, the AI server 200 may determine the second AI apparatus 1222 as an information providing device for the user 1201, and the AI server 200 may transmit a control signal for outputting output information on the user 1201 to the second AI apparatus 1222.

That is, the second AI apparatus 1222 may output at least one of a map or navigation guide information indicating a path for moving to the X3 restaurant 1241 as output information corresponding to the intention information of the user 1201 (1332).

At this time, the AI server 200 may control not to output the output information on the user 1201 to the first AI apparatus 1221 not adjacent to the user 1201 (1331).

Figure 14:
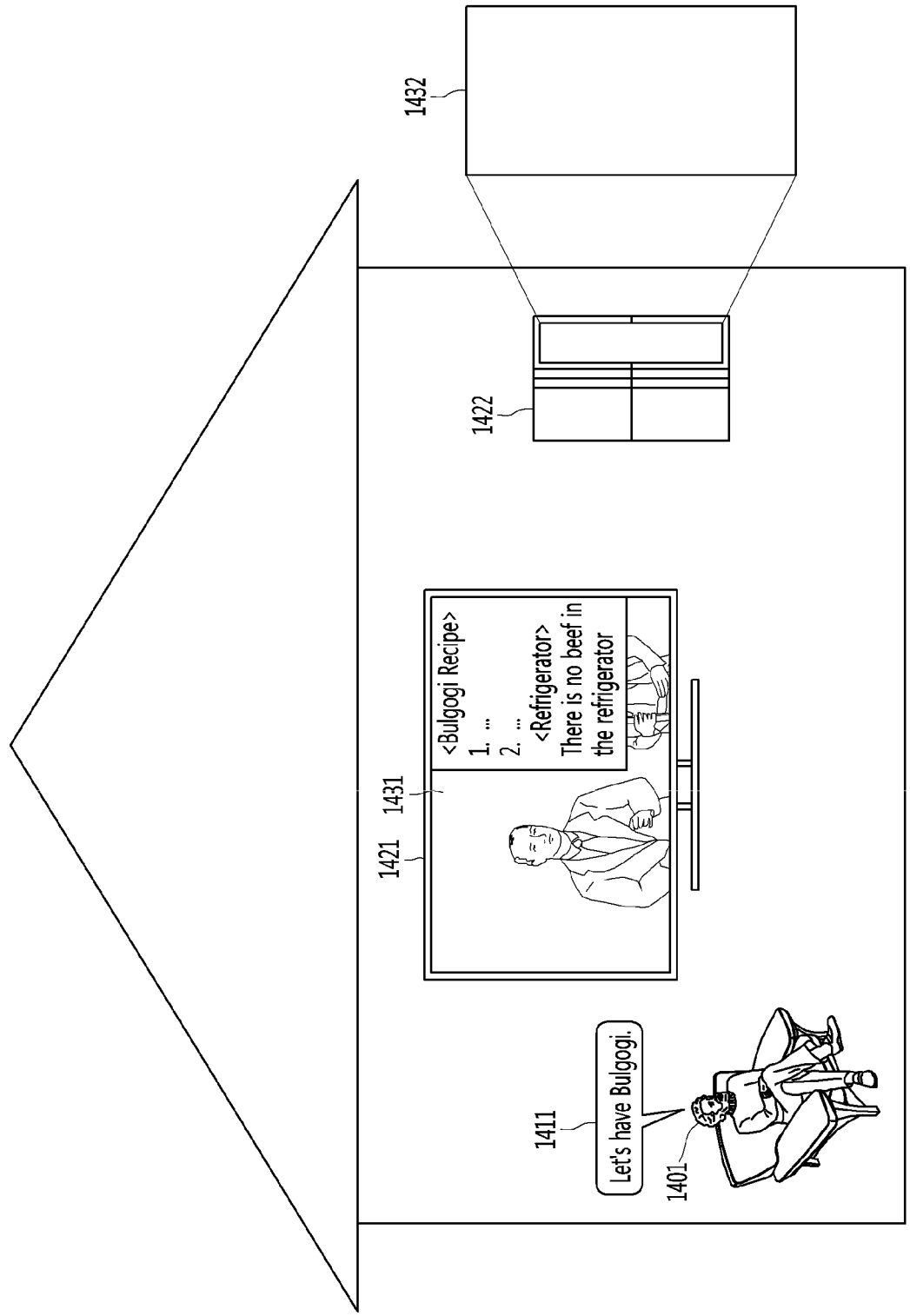
FIGS. 14 to 16 are views illustrating an example of providing information to a user according to an embodiment of the present invention.
Figure 15:
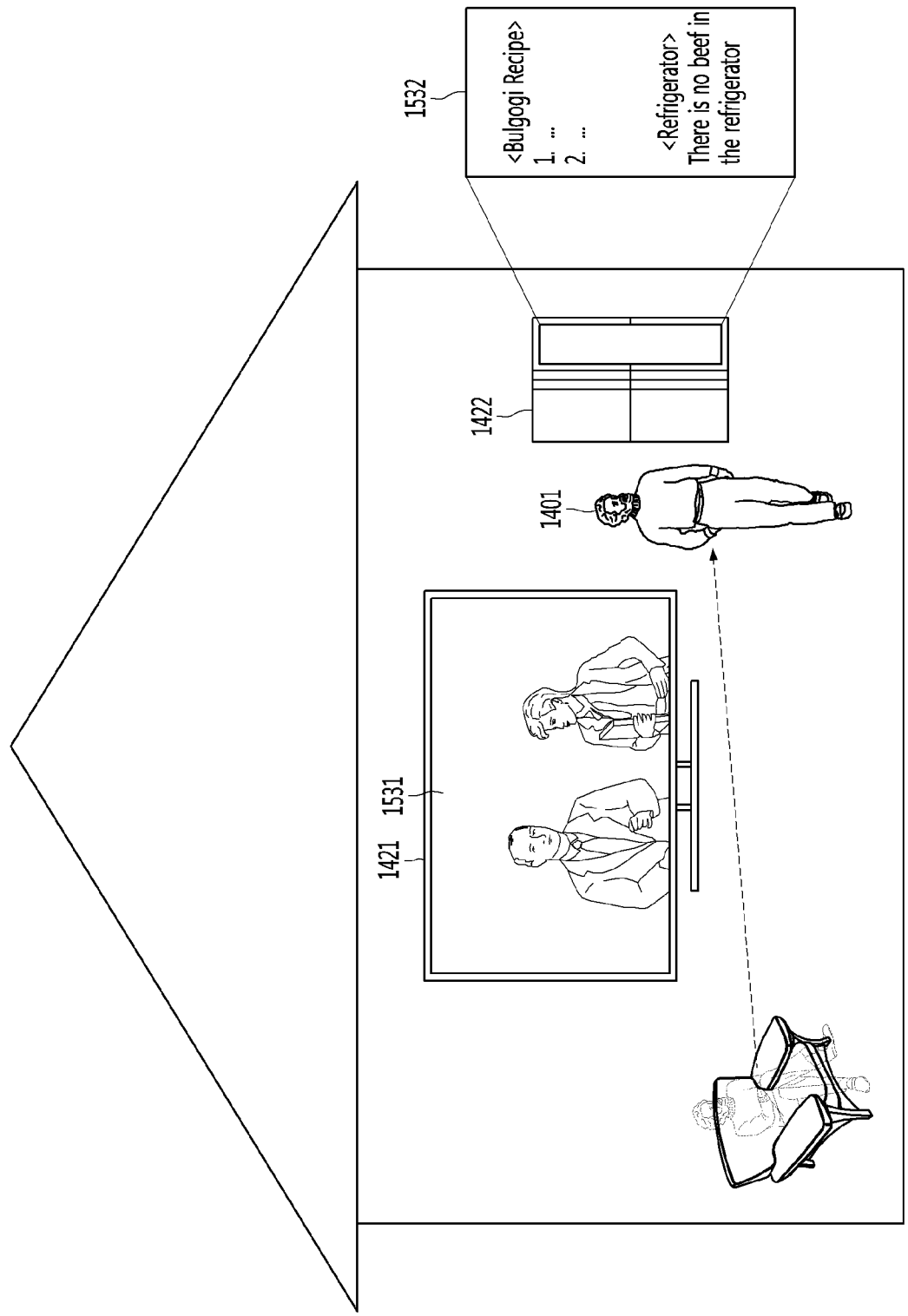
Figure 16:
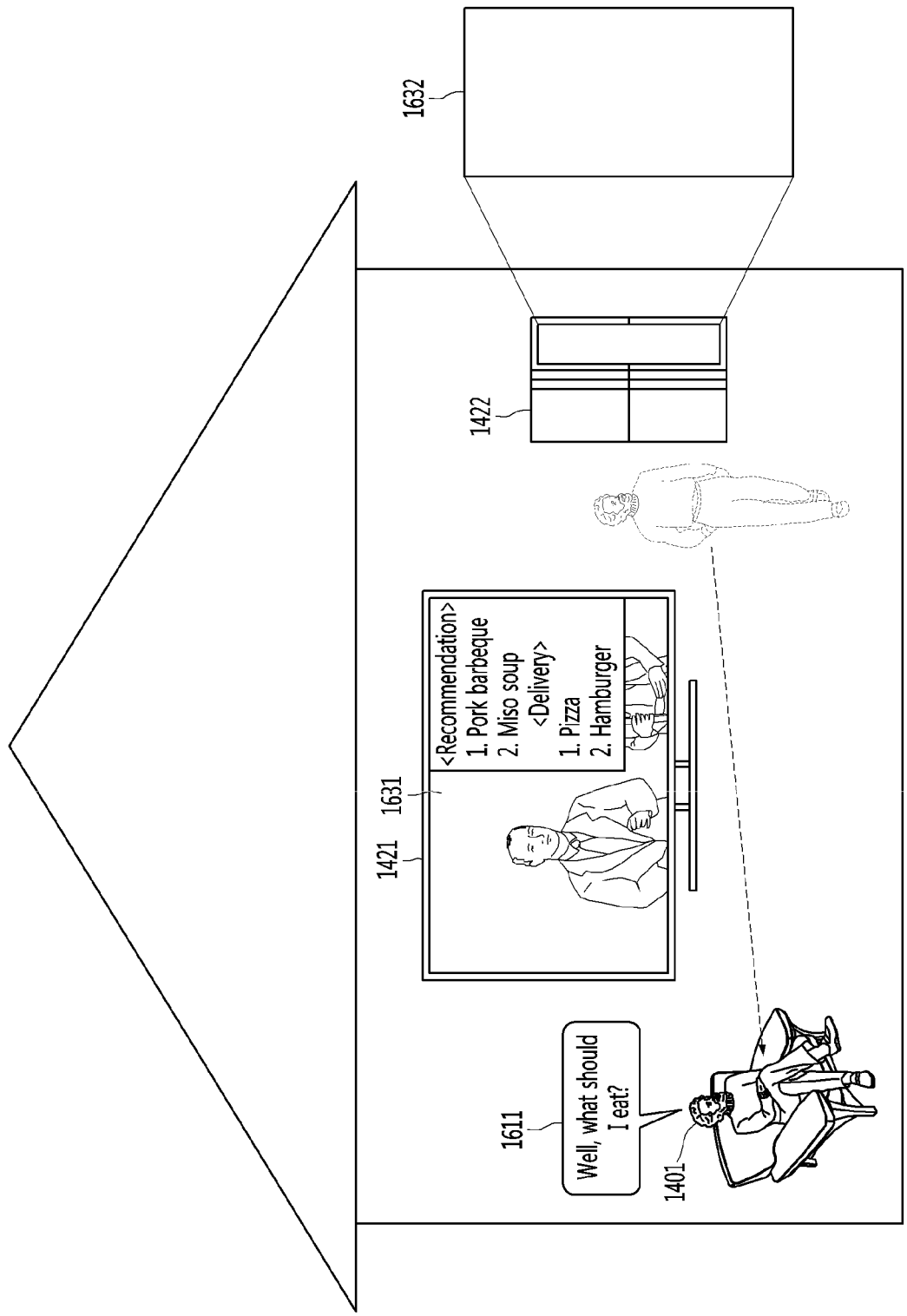

FIGS. 14 to 16 are views illustrating an example of providing information to a user according to an embodiment of the present invention.

FIG. 14 illustrates a situation in which the first AI apparatus 1421 receives a speech of what to cook spoken by the user 1401. This includes not only the situation in which the user 1401 speaks with the intention of inputting to the first AI apparatus 1421, but also the situation in which the user 1401 speaks alone. Here, the first AI apparatus 1421 may be a TV. Then, the second AI apparatus 1422 may be a refrigerator.

Referring to FIG. 14, the user 1201 may speak 1411 such as "Let's have Bulgogi."

Although not shown in FIG. 14, the AI server 200 receives speech data for the user 1401 from the first AI apparatus 1421 so that it may determine the intention information of the user 1401 as "Eat Bulgogi."

In addition, unlike FIG. 14, even if the user 1401 does not speak directly, the AI server 200 may receive the terminal usage information of the user, and when the user searches for a Bulgogi recipe using the user's terminal, determine the intention information using the received terminal usage information.

Then, the AI server 200 may determine the first AI apparatus 1421 adjacent to the user 1401 as an information providing device for the user 1401, and the AI server 200 may transmit a control signal for outputting output information corresponding to the information providing device.

That is, the first AI apparatus 1421 may output at least one of Bulgogi recipes or information on Bulgogi ingredients stored in the refrigerator as output information corresponding to the intention information of the user 1401 (1431).

Here, the output information may include information that there is no beef as a Bulgogi ingredients in the refrigerator.

In particular, the first AI apparatus 1421 may output the output information only to a part of the screen so that the user 1401 may continue to watch the content that is being outputted. In addition, the first AI apparatus 1421 may output the sound included in the output information in a muted state so as not to disturb the viewing of the content that is being outputted.

Here, the AI server 200 may control not to output the output information on the user 1401 to the second AI apparatus 1422 not adjacent to the user 1401 (1432).

FIG. 15 illustrates a situation in which the user 1401 moves to the second AI apparatus 1422 after the situation of FIG. 14. For example, the user 1401 may check the inside of the refrigerator that is the second AI apparatus 1422.

Referring to FIG. 15, the AI server 200 may determine that the user 1401 is far from the first AI apparatus 1421 through image data or speech data generated by the first AI apparatus 1421.

In the same manner, the AI server 200 may determine that the user 1401 is adjacent to the second AI apparatus 1422 through image data or speech data generated by the second AI apparatus 1422. Alternatively, it may be determined that the user 1401 is adjacent to the second AI apparatus 1422 through terminal usage information or status information (e.g., door opening/closing information) on the second AI apparatus 1422 of the AI server 200.

Then, the AI server 200 may determine the second AI apparatus 1422 as an information providing device for the user 1401, and the AI server 200 may transmit a control signal for outputting output information on the user 1401 to the second AI apparatus 1422.

That is, the second AI apparatus 1422 may output at least one of Bulgogi recipes or information on Bulgogi ingredients stored in the refrigerator as output information corresponding to the intention information of the user 1401 (1532).

Here, the output information may include information that there is no beef as a Bulgogi ingredients in the refrigerator.

Here, the AI server 200 may control not to output the output information on the user 1401 to the first AI apparatus 1421 not adjacent to the user 1401 (1531).

FIG. 16 illustrates a situation in which the user 1401 moves to the first AI apparatus 1121 again after the situation of FIG. 15. For example, the user 1401 may move near the TV, which is the first AI apparatus 1421, and watch the TV.

Referring to FIG. 16, the user 1401 may speak 1611 such as "Well, what should I eat?"

Although not shown in FIG. 16, the AI server 200 receives speech data for the user 1401 from the first AI apparatus 1421 so that it may determine the intention information of the user 1401 as "Determining food." That is, the AI server 200 may update the intention information of the user 1401.

In addition, unlike FIG. 16, even if the user 1401 does not speak directly, the AI server 200 may receive the terminal usage information of the user, and when a user searches for recommended food using a user terminal or uses a food delivery application, update the intention information using the received terminal usage information.

Here, the AI server 200 may determine that the user 1401 is far from the second AI apparatus 1422 through image data or speech data generated by the second AI apparatus 1422.

In the same manner, the AI server 200 may determine that the user 1401 is adjacent to the first AI apparatus 1421 through image data or speech data generated by the first AI apparatus 1421.

Then, the AI server 200 may determine the first AI apparatus 1421 as an information providing device for the user 1401, and transmit a control signal for outputting output information on the user 1401 to the first AI apparatus 1421.

That is, the first AI apparatus 1422 may output at least one of recommended or deliverable food that may be made by using the ingredients stored in the refrigerator as output information corresponding to the intention information of the user 1401 (1631).

Here, the AI server 200 may control not to output the output information on the user 1401 to the second AI apparatus 1422 not adjacent to the user 1401 (1632).

According to an embodiment, when the user 1401 looks at the user terminal, the AI server 200 may control to stop outputting the output information to the first AI apparatus 1421 and control to output the output information to the user's terminal.

Figure 17:
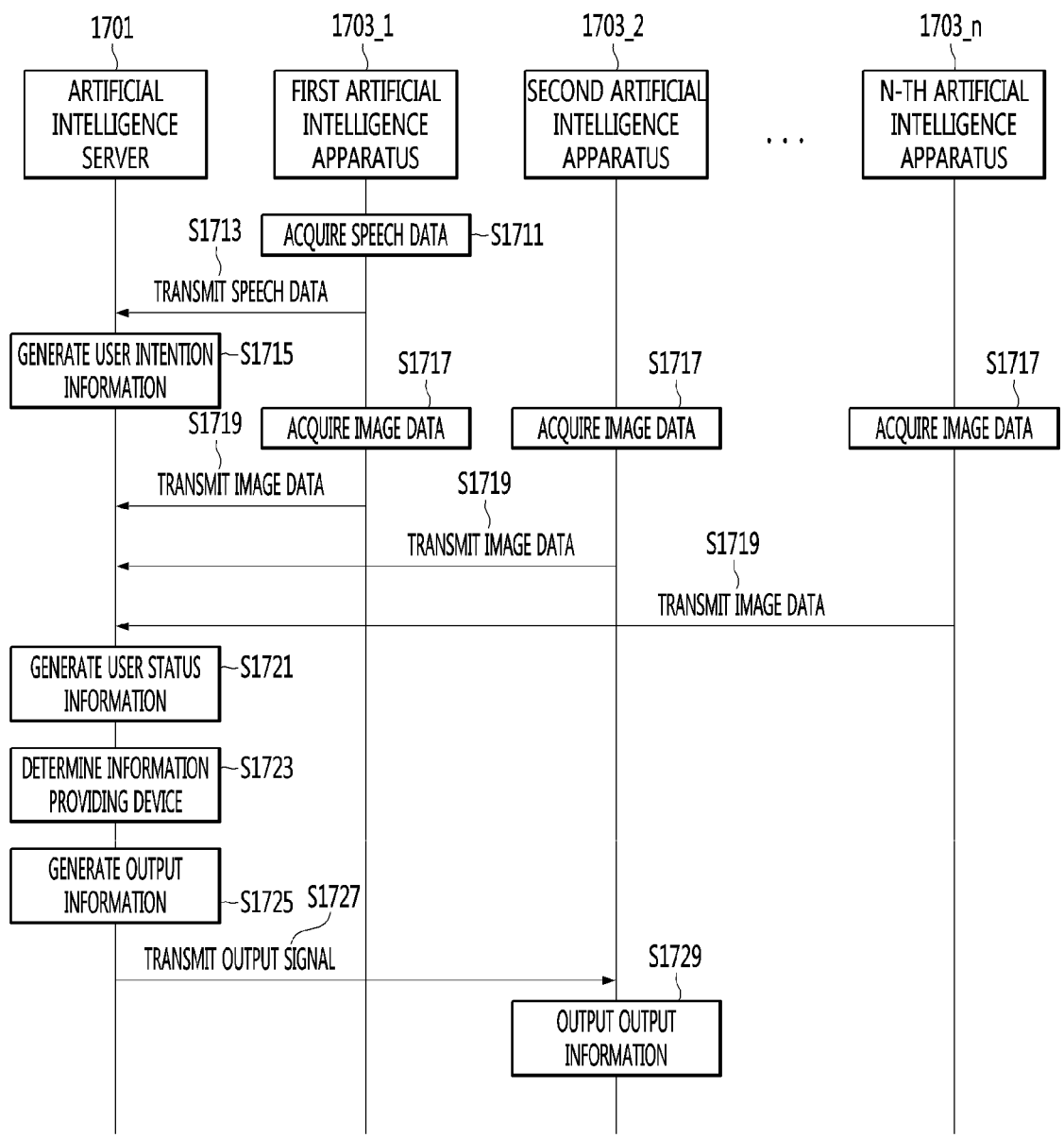
FIG. 17 is a view illustrating an example of providing information to a user according to an embodiment of the present invention.

FIG. 17 is a view illustrating an example of providing information to a user according to an embodiment of the present invention.

Referring to FIG. 17, the first AI apparatus 1703_1 may acquire speech data corresponding to a speech spoken by a user (S1711), and transmit the acquired speech data to the AI server 1701 (S1713).

Then, the AI server 1701 generates user intention information using the received speech data (S1715).

And, each of the AI apparatuses 1703_1, 1703_2, . . . , 1703_n may acquire image data (S1717) and transmit the acquired image data to the AI server 1701 (S1719).

And, the AI server 1701 may generate user status information using the received image data (S1721), determine the second AI apparatus 1703_2 as the information providing device based on the generated user status information (S1723), generate output information based on the generated user intention information and the information providing device (S1725), and transmit an output signal for outputting the generated output information to the second AI apparatus 1703_2 as an information providing device (S1727).

Then, the second AI apparatus 1703_2 as the information providing device may output the output information based on the received output signal (S1729).

In the example of FIG. 17, each of the AI apparatuses 1703_1, 1703_2, . . . , 1703_n simply acquires image data about the user, and the AI server 1701 recognizes the user from the image data received from the AI apparatuses 1703_1, 1703_2, . . . , 1703_n and recognizes the user to generate user status information.

FIG. 18 is a view illustrating an example of providing information to a user according to an embodiment of the present invention.

Referring to FIG. 18, the first AI apparatus 1803_1 may acquire speech data corresponding to a speech spoken by a user (S1811), and transmit the acquired speech data to the AI server 1801 (S1813).

Then, the AI server 1801 generates user intention information using the received speech data (S1815).

And, each of the AI apparatuses 1803_1, 1803_2, . . . , 1803_n may generate user identification information (S1817), and transmit the generated user identification information to the AI server 1801 (S1819).

Here, each of the AI apparatuses 1803_1, 1803_2, . . . , 1803_n may acquire image data and generate user recognition information by recognizing the user from the acquired image data.

And, the AI server 1801 may generate user status information using the user recognition information (S1821), determine the second AI apparatus 1803_2 as the information providing device based on the generated user status information (S1823), generate output information based on the generated user intention information and the information providing device (S1825), and transmit an output signal for outputting the generated output information to the second AI apparatus 1803_2 as an information providing device (S1827).

Then, the second AI apparatus 1803_2 as the information providing device may output the output information based on the received output signal (S1829).

In the example of FIG. 18, each of the AI apparatuses 1803_1, 1803_2, . . . , 1803_n acquires image data about the user, and recognizes the user from the acquired image data to generate the user recognition information. Then, the AI server 1801 generates user status information using the user recognition information generated by the AI apparatuses 1803_1, 1803_2, . . . , 1803_n.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

The invention claimed is:
1. An artificial intelligence server for providing information to a user, the artificial intelligence server comprising:
 a communication unit configured to communicate with a plurality of artificial intelligence apparatuses deployed in a service area; and
 a processor configured to:
 receive at least one of speech data of the user from at least one of the plurality of artificial intelligence apparatuses,
 receive terminal usage information of the user from a terminal,
 generate first intention information of the user using a first intention information generation model based on the at least one of speech data,
 generate second intention information of the user using a second intention information generation model based on the terminal usage information, determine intention information based on at least one of the first intention information and the second intention information, generate status information of the user using the plurality of artificial intelligence apparatuses based on speech data on the user, image data on the user, or terminal status information on the user from the plurality of artificial intelligence apparatuses or the terminal, determine at least one information providing device among the plurality of artificial intelligence apparatuses and the terminal based on at least one of the status information of the user or the intention information, generate at least one output information according to each of the at least one information providing device based on the intention information of the user to be output from each of the at least one information providing device, and transmit, respectively at least one control signal for outputting the at least one output information according to each of the at least one information providing device to the at least one information providing device.

2. The artificial intelligence server of claim 1, wherein the terminal usage information comprises at least one of a usage record, a search record, a search result and a search result reading record for the terminal or the at least one of the plurality of artificial intelligence apparatuses.

3. The artificial intelligence server of claim 1, wherein the processor is configured to generate the first intention information from the speech data using a natural language processing (NLP) technique.

4. The artificial intelligence server of claim 1, wherein the processor is configured to generate the second intention information from the terminal usage record using an artificial neural network learned by using a machine learning algorithm or a deep learning algorithm, and wherein the second intention information generated by the second intention information generation model is updated based on the terminal usage information when the user uses the terminal.

5. The artificial intelligence server of claim 1, wherein the status information comprises at least one of a location of the user, a route of the user, a moving direction of the user, a gaze direction of the user, or a motion of the user.

6. The artificial intelligence server of claim 5, wherein the processor is configured to:

receive the at least one of speech data on the user, the image data on the user, or the terminal status information on the user from the plurality of artificial intelligence apparatuses or the terminal, and generate the status information based on at least one of the speech data, the image data, or the terminal status information.

7. The artificial intelligence server of claim 6, wherein the processor is configured to:

receive at least one image data from at least one of the plurality of artificial intelligence apparatuses or a plurality of image data from a single artificial intelligence apparatus, recognize the user from the at least one image data or the plurality of image data, and user identification information of the user using a user recognition model to generate a recognition result, and generate the status information using the recognition result, wherein the user recognition model comprises an artificial neural network and is learned by using a machine learning algorithm or a deep learning algorithm.

8. The artificial intelligence server of claim 5, wherein the processor is configured to:

transmit a user recognition model or user identification information to the at least one of the plurality of artificial intelligence apparatuses, receive user recognition information generated for the user from the at least one of the plurality of artificial intelligence apparatuses, and generate the status information by using the received user recognition information.

9. The artificial intelligence server of claim 5, wherein the processor is configured to determine, as the at least one information providing device, a device located within a first reference distance from the user among the plurality of artificial intelligence apparatuses, wherein the processor prevents output of the at least one output information when the user is out of the first reference distance.

10. The artificial intelligence server of claim 9, wherein the processor is configured to determine, as the at least one information providing device, a first artificial intelligence apparatus located within a predetermined angle from the gaze direction of the user and located within a second reference distance from the user among the plurality of artificial intelligence apparatuses, wherein the at least one information providing device is changed to a second artificial intelligence apparatus or the terminal when the user changes the gaze direction from the first artificial intelligence apparatus to the second artificial intelligence apparatus or the terminal.

11. The artificial intelligence server of claim 1, wherein the processor is configured to:

update at least one of the intention information or the status information periodically or in real time, and update at least one of the at least one information providing device or the output information when at least one of the intention information or the status information is changed.

12. A method of providing information to a user, the method comprising:

receiving at least one of speech data of the user from at least one of a plurality of artificial intelligence apparatuses deployed in a service area;

receiving terminal usage information of the user from a terminal;

generating first intention information of the user using a first intention information generation model based on at least one of the at least one speech data;

generating second intention information of the user using a second intention information generation model based on the terminal usage information;

determining intention information based on at least one of the first intention information and the second intention information;

generating status information of the user using the plurality of artificial intelligence apparatuses;

determining at least one information providing device among the plurality of artificial intelligence apparatuses and the terminal based on at least one of the status information of the user or the intention information;

generating at least one output information according to each of the at least one information providing device based on the intention information of the user to be output from each of the at least one information providing device; and transmitting, respectively, a control signal for outputting the at least one output information according to each of the at least one information providing device to the at least one information providing device.

13. A non-transitory recording medium having recorded thereon a program for performing a method for providing information to a user,
wherein the method for providing the information to the user comprises:
receiving at least one of speech data of the user from at least one of a plurality of artificial intelligence apparatuses deployed in a service area, receiving terminal usage information of the user from a terminal;
generating first intention information of the user using a first intention information generation model based on at least one of the at least one speech data;
generating second intention information of the user using a second intention information generation model based on the terminal usage information;
determining intention information based on at least one of the first intention information and the second intention information;
generating status information of the user using the plurality of artificial intelligence apparatuses;
determining at least one information providing device among the plurality of artificial intelligence apparatuses and the terminal based on at least one of the status information of the user or the intention information;
generating at least one output information according to each of the at least one information providing device based on the intention information of the user to be output from each of the at least one information providing device; and
transmitting, respectively, a control signal for outputting the at least one output information according to each of the at least one information providing device to the at least one information providing device.

14. The artificial intelligence server of claim 6, wherein the terminal status information includes at least one of location information of the terminal, operation status information of the terminal, or input status information of the terminal.

15. The artificial intelligence server of claim 1, wherein the processor is configured to output the output information only to a part of a screen of the at least one information providing device displaying a content.

16. The artificial intelligence server of claim 1, further comprising a memory configured to store at least one of a plurality of user identification information, user identification information, user terminal information, or user account information corresponding to a plurality of users to distinguish each user.

17. The artificial intelligence server of claim 16, wherein the processor is configured to:
identify each of the plurality of users based on the plurality of user identification information using a user recognition model,
receive at least one of speech data of the plurality of users from at least one of the plurality of artificial intelligence apparatuses,
generate intention information and status information for each of the plurality of users individually,
determine at least one the information providing device and output information for each of the plurality of users, and
transmit a control signal to the at least one information providing device for outputting the output information for each of the plurality of users.

18. The artificial intelligence server of claim 17, wherein the processor is configured to transmit the control signal to a first artificial intelligence apparatus for outputting the output information for each of the plurality of users when the plurality of users are adjacent to the first artificial intelligence apparatus.

19. The artificial intelligence server of claim 18, wherein the first artificial intelligence apparatus comprises at least one digital signage in the service area.

20. The artificial intelligence server of claim 1, wherein the at least one of speech data of the user includes at least one of a query, a request, a command or a conversation.

* * * * *